(12) United States Patent
Wang et al.

(10) Patent No.: US 10,952,067 B2
(45) Date of Patent: Mar. 16, 2021

(54) TERMINAL AND BASE STATION

(71) Applicant: NTT DOCOMO, INC., Tokyo (JP)

(72) Inventors: Jing Wang, Beijing (CN); Anxin Li, Beijing (CN); Lan Chen, Beijing (CN); Xin Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/776,252

(22) Filed: Jan. 29, 2020

(65) Prior Publication Data
US 2020/0367051 A1 Nov. 19, 2020

(30) Foreign Application Priority Data
May 17, 2019 (CN) .......................... 201910413603.7

(51) Int. Cl.
*H04W 8/24* (2009.01)
*G06N 3/08* (2006.01)

(52) U.S. Cl.
CPC ................. *H04W 8/24* (2013.01); *G06N 3/08* (2013.01); *H04W 8/245* (2013.01)

(58) Field of Classification Search
CPC .......... H04W 8/24; H04W 8/245; G06N 3/08; G06N 3/10
See application file for complete search history.

(56) References Cited

U.S. PATENT DOCUMENTS

| | | | | |
|---|---|---|---|---|
| 6,006,091 A * | 12/1999 | Lupien | ................... | H04W 8/20 455/419 |
| 8,149,843 B2 * | 4/2012 | Oswal | ................... | H04L 12/66 370/312 |
| 8,289,922 B2 * | 10/2012 | Ewe | ................... | H04W 36/0033 370/252 |
| 2004/0075606 A1 * | 4/2004 | Laiho | ................... | G01S 5/0252 342/357.31 |
| 2009/0210361 A1 * | 8/2009 | Chen | ................... | H04L 67/2819 706/10 |
| 2010/0279683 A1 * | 11/2010 | Lee | ................... | H04W 48/08 455/434 |
| 2014/0105163 A1 * | 4/2014 | Yu | ................... | H04W 76/11 370/329 |

* cited by examiner

*Primary Examiner* — Julio R Perez
(74) *Attorney, Agent, or Firm* — Osha Bergman Watanabe & Burton LLP

(57) ABSTRACT

The present disclosure provides a terminal and a base station in a wireless communication system. The terminal includes: a processing unit for obtaining terminal network capability information about at least one of a computing capability, a storage capability, and a support capability for neural network of the terminal; and a transmitting unit for transmitting the terminal network capability information to a base station.

9 Claims, 4 Drawing Sheets

600

Obtaining terminal network capability information about at least one of a computing capability, a storage capability, and a support capability for neural network of the terminal performing this method — S610

Transmitting the terminal network capability information to a base station — S620

US 10,952,067 B2

TERMINAL AND BASE STATION

CROSS-REFERENCE TO RELATED APPLICATIONS

This application claims the benefit and priority of Chinese Application No. 201910413603.7, filed May 17, 2019. The entire disclosure of the above application is incorporated herein by reference.

TECHNICAL FIELD

The present disclosure relates to the field of wireless communication, and more particularly, to a terminal and a base station in the field of wireless communication.

BACKGROUND

With the development of technology, artificial intelligence (AI) technology has been used in many different fields. It can be expected that in the near future, base stations or mobile stations with AI functions may also be proposed in a wireless communication system, in order to provide services to users more efficiently.

That is to say, in the future, there may be both traditional terminals and terminals supporting AI functions in respective cells, and with respect to the terminals supporting AI functions, specific capabilities supported by different terminals for the AI functions may also be different. Similar to terminals, there may be both traditional base stations and base stations supporting AI functions in a communication system, and with respect to the base stations supporting AI functions, specific capabilities supported by different base stations for the AI functions may also be different.

However, respective terminals or base stations do not necessarily support AI functions, the specific capabilities of the terminals or the base stations supporting AI functions may be different, and a terminal or a base station does not know whether its counterpart supports an AI function and its specific capability. In such a case, if the base station or the terminal uses a preset AI function to assist the communication between the base station and the terminal, the AI-assisted communication method may not be applicable for the communication counterpart which does not support the AI function or does not have a specific capability.

SUMMARY

According to an aspect of the present disclosure, a terminal is provided. The terminal comprises: a processing unit for obtaining terminal network capability information about at least one of a computing capability, a storage capability, and a support capability for neural network of the terminal; and a transmitting unit for transmitting the terminal network capability information to a base station.

According to an example of the present disclosure, in the terminal, when the terminal network capability information includes information about a plurality of capabilities of the computing capability, the storage capability, and the support capability for neural network of the terminal, the terminal network capability information is information that indicates the plurality of capabilities respectively.

According to an example of the present disclosure, in the terminal, when the terminal network capability information includes information about a plurality of capabilities of the computing capability, the storage capability, and the support capability for neural network of the terminal, the terminal network capability information is information that jointly indicates the plurality of capabilities.

According to an example of the present disclosure, the terminal may further comprise a storage unit for storing a network capability table, wherein the network capability table is a table about at least one of the computing capability, the storage capability, and the support capability for neural network.

According to an example of the present disclosure, the terminal may further comprise a receiving unit for receiving a capability acquisition request from the base station; wherein the transmitting unit transmits the terminal network capability information to the base station according to the capability acquisition request.

According to an example of the present disclosure, the terminal may further comprise a receiving unit for receiving the terminal network configuration information from the base station, wherein the terminal network configuration information indicates a configuration for a neural network of the terminal.

According to an example of the present disclosure, the terminal network configuration information includes information about at least one of a number of network layers, a number of nodes per layer, connection relationship, an activation function, and a network coefficient of the neural network of the terminal.

According to another aspect of the present disclosure, a terminal is provided. The terminal comprises: a receiving unit for receiving base station network configuration information from a base station, wherein the base station network configuration information indicates a configuration for a neural network of the base station; and a processing unit for determining the configuration for the neural network of the base station according to the base station network configuration information.

According to an example of the present disclosure, the processing unit of the terminal further determines a configuration for a neural network of the terminal according to the base station network configuration information.

According to another aspect of the present disclosure, a base station is provided. The base station comprises: a receiving unit for receiving terminal network capability information from a terminal; a processing unit for determining terminal network configuration information of the terminal according to the terminal network capability information; and a transmitting unit for transmitting the terminal network configuration information to the terminal.

According to an example of the present disclosure, the processing unit of the base station further determines the terminal network configuration information according to at least one of an environment of a cell where the base station is located and a location of the terminal.

According to an example of the present disclosure, the processing unit of the base station further determines a configuration for a neural network of the base station according to the terminal network configuration information.

According to an example of the present disclosure, the processing unit of the base station further determines at least one of feedback resource information and modulation and coding scheme information of the terminal according to the terminal network configuration information; and the transmitting unit further transmits the at least one of the feedback resource information and the modulation and coding scheme information which has been determined.

According to another aspect of the present disclosure, a base station is provided. The base station comprises: a processing unit for obtaining base station network configuration information of the base station, where the base station network configuration information indicates a configuration for a neural network of the base station; and a transmitting unit for transmitting the base station network configuration information to a terminal.

According to another aspect of the present disclosure, a transmitting method performed by a terminal is provided. The method comprises: obtaining terminal network capability information about at least one of a computing capability, a storage capability, and a support capability for neural network of the terminal; and transmitting the terminal network capability information to a base station.

According to an example of the present disclosure, in the transmitting method, when the terminal network capability information includes information about a plurality of capabilities of the computing capability, the storage capability, and the support capability for neural network of the terminal, the terminal network capability information is information that indicates the plurality of capabilities respectively.

According to an example of the present disclosure, in the transmitting method, when the terminal network capability information includes information about a plurality of capabilities of the computing capability, the storage capability, and the support capability for neural network of the terminal, the terminal network capability information is information that jointly indicates the plurality of capabilities.

According to an example of the present disclosure, the transmitting method further comprises storing a network capability table, wherein the network capability table is a table about at least one of the computing capability, the storage capability, and the support capability for neural network.

According to an example of the present disclosure, the transmitting method further comprises receiving a capability acquisition request from the base station; wherein the terminal network capability information is transmitted to the base station according to the capability acquisition request.

According to an example of the present disclosure, the transmitting method further comprises receiving the terminal network configuration information from the base station, wherein the terminal network configuration information indicates a configuration for a neural network of the terminal.

According to an example of the present disclosure, the terminal network configuration information includes information about at least one of a number of network layers, a number of nodes per layer, connection relationship, an activation function, and a network coefficient of the neural network of the terminal.

According to another aspect of the present disclosure, a receiving method performed by a terminal is provided. The receiving method comprises: receiving base station network configuration information from a base station, where the base station network configuration information indicates a configuration for a neural network of the base station; and determining the configuration of the neural network of the base station according to the base station network configuration information.

According to an example of the present disclosure, the receiving method performed by the terminal further comprises determining a configuration for a neural network of the terminal according to the base station network configuration information.

According to another aspect of the present disclosure, a receiving method performed by a base station is provided. The receiving method comprises: receiving terminal network capability information from a terminal; determining terminal network configuration information of the terminal according to the terminal network capability information from the terminal; and transmitting the terminal network configuration information to the terminal.

According to an example of the present disclosure, the receiving method further comprises determining the terminal network configuration information according to at least one of an environment of a cell where the base station is located and a location of the terminal.

According to an example of the present disclosure, the receiving method further comprises determining a configuration for a neural network of the base station according to the terminal network configuration information.

According to an example of the present disclosure, the receiving method further comprises determining at least one of feedback resource information and modulation and coding scheme information of the terminal according to the terminal network configuration information; and transmitting the at least one of the feedback resource information and the modulation and coding scheme information which has been determined.

According to another aspect of the present disclosure, a transmitting method performed by a base station is provided. The transmitting method comprises: obtaining base station network configuration information of the base station, where the base station network configuration information indicates a configuration for a neural network of the base station; and transmitting the base station network configuration information to a terminal.

BRIEF DESCRIPTION OF THE DRAWINGS

The above and other objects, features, and advantages of the present disclosure will become more apparent by describing the embodiments of the present disclosure in more detail with reference to the accompanying drawings. The drawings are used to provide a further understanding of the embodiments of the present disclosure, and constitute a part of the specification, and the drawings are used to explain the present disclosure together with the embodiments of the present disclosure, and do not constitute a limitation of the disclosure. In the drawings, same reference numerals generally represent same components or steps.

DETAILED DESCRIPTION

Figure 1:
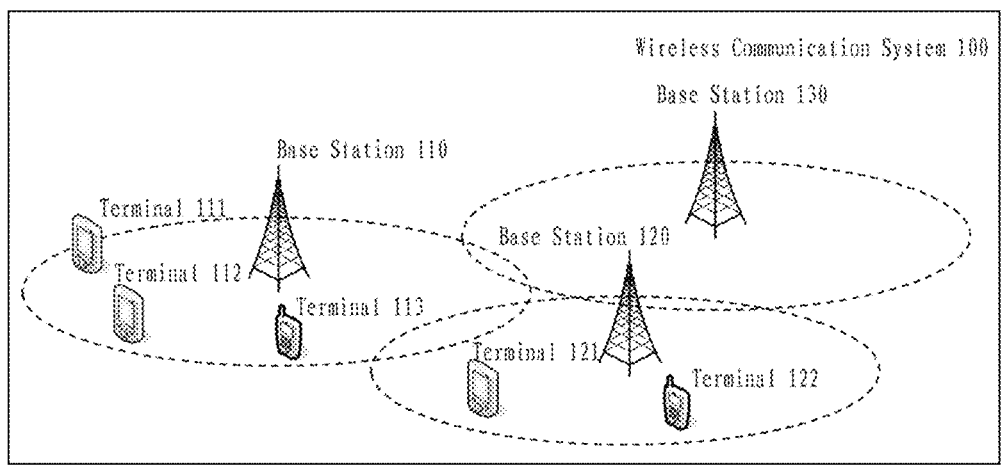
FIG. 1 is a schematic diagram of a wireless communication system in which embodiments of the present disclosure can be applied.

In order to make the objectives, technical solutions, and advantages of the present disclosure more apparent, example embodiments according to the present disclosure will be described in detail below with reference to the accompanying drawings. In the drawings, same reference numerals denote same elements throughout the document. It should be understood that the embodiments described herein are merely illustrative and should not be construed as limiting the scope of the present disclosure. In addition, the terminals described herein may include various terminals, such as user equipment (UE), mobile terminals (or referred to as mobile stations), or fixed terminals. However, for convenience, the terminal and UE are sometimes used interchangeably hereinafter. Further, in the embodiments of the present disclosure, a neural network is an artificial neural network used in an AI function module. For brevity, it is sometimes referred to as a neural network in the following description.

First, a wireless communication system in which an embodiment of the present disclosure can be applied is described with reference to FIG. 1. The wireless communication system may be a 5G system, or any other type of wireless communication system, such as a Long Term Evolution (LTE) system, an LTE-A (advanced) system, or the like. Hereinafter, embodiments of the present disclosure are described using a 5G system as an example, but it should be recognized that the following description may also be applied to other types of wireless communication systems.

As shown in FIG. 1, the wireless communication system 100 may include base stations 110, 120, and 130. In a cell where the base station 110 is located, terminals 111, 112, and 113 exist, and in a cell where the base station 120 is located, terminals 121 and 122 exist. In the example shown in FIG. 1, the base station 110 can support a first type of neural network, the base station 120 can support a second type of neural network, and the base station 130 is a traditional base station, which may not have an AI function and not support any type of neural network. In addition, in the cell where the base station 110 is located, the terminal 111 can support a third type of neural network, the terminal 112 can support a fourth type of neural network, and the terminal 113 is a traditional terminal, which may not have an AI function and not support any type of neural network. In addition, in the cell where the base station 120 is located, the terminal 121 can support any one of the third type, the fourth type, and the fifth type of neural network, and the terminal 122 is a traditional terminal, which may not have an AI function and not support any type of neural network.

In respective cells of the wireless communication system 100 shown in FIG. 1, since the terminals and the base stations do not know whether their counterparts support an AI function and their specific capabilities, the terminals and the base stations can only independently use their neural networks to assist in the communication respectively. This may result in that the terminals or the base stations cannot specifically set the neural networks they can support to further improve efficiency and quality of the communication. In addition, it may be difficult to accurately determine the preferred neural network for the current communication for terminals and base stations that support multiple neural networks or different neural network configurations.

Figure 2:
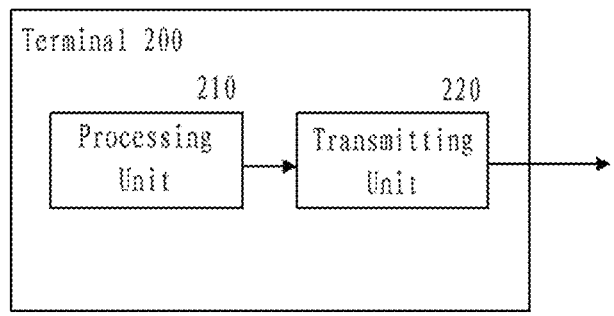
FIG. 2 is a schematic structural diagram of a terminal according to an embodiment of the present disclosure.

To solve the above problems, the present disclosure proposes a terminal and a base station. Hereinafter, a terminal according to an embodiment of the present disclosure will be described with reference to FIG. 2. FIG. 2 is a schematic structural diagram of a terminal according to an embodiment of the present disclosure.

As shown in FIG. 2, the terminal 200 includes a processing unit 210 and a transmitting unit 220. The processing unit 210 may obtain information related to a processing capability of the terminal 200 or an AI capability of the terminal 200. For example, the processing unit 210 may obtain terminal network capability (or capacity) information related to a neural network supported by the terminal 200. As another example, the terminal network capability information may include information about attributes of the neural network itself that the terminal can support, such as information about the type of the neural network. In addition, the terminal network capability information may include information of capabilities related to running a neural network, such as information about a computing capability, a storage capability of the terminal, and the like. In the example shown in FIG. 2, the processing unit 210 may obtain terminal network capability information about at least one of the computing capability, the storage capability, and the support capability for neural network of the terminal 200. In addition, if the AI function of the terminal 200 is implemented in other manner than a neural network, the processing unit 200 may obtain attribute information about the other manner itself, for example, information of the support capability for other artificial intelligence algorithm, and information of capabilities related to running a neural network. In the following examples of the present disclosure, description will be made taking an AI function being implemented by a neural network as an example. However, as can be understood, similar solutions can also be used in cases where AI functions are implemented in other manner.

According to an example of the present disclosure, the terminal network capability information may directly indicate specific attributes of the neural network itself, and specific capabilities related to running the neural network. For example, the computing capability of the terminal may be indicated by a number of floating-point operations that the terminal can perform per second. In this case, the terminal network capability information may include information that directly indicates the number of floating-point operations that the terminal 200 can perform per second.

According to another example of the present disclosure, the attributes of the neural network itself and the capabilities related to running the neural network may be graded or classified in advance, and the processing unit 210 may obtain terminal network capability information of a level corresponding to the capabilities of the terminal 200 itself.

For example, as described above, the computing capability of the terminal may be indicated by the number of floating-point operations that can be performed by the terminal per unit time. In this case, the grading may be performed in advance according to the numbers of floating-point operations that can be performed per unit time by respective terminals that might appear in the communication system. Table 1 is a table of computing capability levels set in advance in a case where the computing capability of the terminal is indicated by the number of floating-point operations that the terminal can perform per second.

TABLE 1

Table of computing capability levels -1

| | Computing capability (trillion floating point operations per second (TFLOPS)) |
|---|---|
| Level 1 | Less than 10TFLOPS |
| Level 2 | 11~20TFLOPS |
| Level 3 | 21~30TFLOPS |
| Level 4 | Greater than 30TFLOPS |

Assuming that the terminal 200 can perform 25 trillion floating-point operations per second, the processing unit 210 may obtain terminal network capability information indicating that the computing capability level is level 3.

As another example, the computing capability of the terminal may also be indicated by a number of layers of the neural network supported by the terminal. In this case, the grading may be performed in advance according to the numbers of layers of the neural networks supported by respective terminals that might appear in the communication system. Table 2 is a table of computing capability levels set in advance in a case where the computing capability of the terminal is indicated by the number of layers of the neural network supported by the terminal.

TABLE 2

Table of computing capability levels - 2

| | Computing capability (number of layers of the neural network) |
|---|---|
| Level 1 | Supporting less than 5 layers |
| Level 2 | Supporting 6~10 layers |
| Level 3 | Supporting 11~50 layers |
| Level 4 | Supporting more than 51 layers |

Assuming that the maximum number of layers of the neural network supported by the terminal 200 is 7, the processing unit 210 may obtain terminal network capability information indicating that the computing capability level is level 2.

As another example, the grading may be performed in advance according to storage spaces of respective terminals that might appear in the communication system. Table 3 is a table of storage capability levels set in advance.

TABLE 3

Table of storage capability levels

| | Storage capability (GB) |
|---|---|
| Level 1 | Less than 4 GB |
| Level 2 | 5~10 GB |
| Level 3 | 11~20 GB |
| Level 4 | Greater than 20 GB |

Assuming that the storage space of the terminal 200 is 16 GB, the processing unit 210 may obtain terminal network capability information indicating that the storage capability level is level 3.

As another example, the terminal's support capability for neural network can be indicated by whether the terminal supports a neural network and the type of neural network supported. In this case, the grading may be performed in advance according to whether a neural network is supported by respective terminals that might appear in the communication system and the type of the neural network that is supported. Table 4 is a table of support capability levels for neural network set in advance.

TABLE 4

Table of support capability levels for neural network

| | Support capability for neural network |
|---|---|
| Level 1 | Not supporting a neural network |
| Level 2 | Supporting a convolutional neural network |

TABLE 4-continued

Table of support capability levels for neural network

| | Support capability for neural network |
|---|---|
| Level 3 | Supporting a recurrent neural network |
| Level 4 | Supporting a recursive neural network |

Assuming that the terminal 200 supports a convolutional neural network, the processing unit 210 may obtain terminal network capability information indicating that the support capability level for the neural network is level 2.

Alternatively, candidate configurations regarding respective neural networks may be set in advance. For example, candidate configurations regarding a number of layers, a number of nodes per layer, connection relationship, a network coefficient, an activation function, etc. of the respective neural networks may be set in advance.

In addition, the terminal network capability information may include information of all or part of the neural networks supported by the terminal 200.

In the foregoing, descriptions have been made as an example with reference to Tables 1 to 4 by setting the capability indication tables in advance for the computing capability, the storage capability, and the support capability for neural network, respectively. According to the above example, when the terminal network capability information includes information about a plurality of capabilities of the terminal's computing capability, storage capability, and support capability for neural network, the terminal network capability information includes information that indicates the plurality of capabilities respectively.

Alternatively, according to another example of the present disclosure, a table that jointly indicates a plurality of capabilities may also be set in advance. Table 5 is a table of levels set in advance regarding both computing capability and storage capability.

TABLE 5

Table of joint levels of computing capability and storage capability

| | Computing capability (trillion floating-point operations per second) + Storage capability (GB) |
|---|---|
| Level 1 | Less than 10TFLOPS, less than 4 GB |
| Level 2 | Less than 10TFLOPS, 5~10 GB |
| Level 3 | Less than 10TFLOPS, 11~20 GB |
| Level 4 | Less than 10TFLOPS, greater than 20 GB |
| Level 5 | Greater than 10TFLOPS, less than 4 GB |
| Level 6 | Greater than 10TFLOPS, 5~10 GB |
| Level 7 | Greater than 10TFLOPS, 11~20 GB |
| Level 8 | Greater than 10TFLOPS, greater than 20 GB |

According to the example described above in conjunction with Table 5, when the terminal network capability information includes information about a plurality of capabilities of the terminal's computing capability, storage capability, and support capability for neural network, the terminal network capability information is information that jointly indicates the plurality of capabilities. For example, when the terminal 200 can perform 25 trillion floating-point operations per second and the storage space is 16 GB, the terminal network capability information may include information indicating level 7.

In addition, according to another example of the present disclosure, the terminal 200 may further include a storage unit to store a network capability table such as Tables 1-5 as described above. The network capability table is a table about at least one of the computing capability, the storage capability, and the support capability for neural network. The network capability table may also be a table of a combination of more than one capabilities described above.

Then, the transmitting unit 220 may transmit the terminal network capability information to the base station. According to an example of the present disclosure, the transmitting unit 220 may actively report the terminal network capability information of the terminal 200 to the base station. According to another example of the present disclosure, the terminal network capability information of the terminal 200 may be transmitted according to an instruction of the base station when the base station instructs the terminal 200 to report its AI capability or network support capability. For example, the terminal 200 may include a receiving unit to receive a capability acquisition request from the base station. The transmitting unit 220 may transmit the terminal network capability information to the base station according to the capability acquisition request.

In this embodiment, by the terminal transmitting the information about at least one of the terminal's own computing capability, storage capability, and support capability for neural network to the base station, the base station can know whether the terminal supports an AI function, the specific capabilities of the terminal related to the running of the neural network, or the attributes of the neural network supported by the terminal, so that the base station configures a neural network suitable for the current communication for the terminal according to the relevant capabilities of the terminal.

For example, the base station may determine the terminal network configuration for the terminal 200 according to the terminal network capability information from the terminal 200, and transmit the related terminal network configuration information to the terminal 200, so that the terminal 200 configures its own neural network according to the terminal network configuration information transmitted by the base station. In this case, the terminal 200 may further include a receiving unit to receive the terminal network configuration information from the base station, where the terminal network configuration information indicates a configuration for the neural network of the terminal.

According to an example of the present disclosure, the terminal network configuration information may include information about at least one of the number of network layers, the number of nodes per layer, the connection relationship, the activation function, and the network coefficient of the neural network of the terminal. For example, the connection relationship may include connection types of nodes in a neural network, such as a full connection, a convolutional neural network, a regression neural network, or the like. As another example, the activation function may include an activation function type of a layer of the neural network, such as Sigmoid, ReLU, or the like. As another example, the network coefficient may include weights on connections between nodes in respective layers of the network.

As mentioned before, candidate configurations for respective neural networks may be set in advance. For example, candidate configurations regarding the numbers of layers, the numbers of nodes per layer, connection relationship, network coefficients, activation functions, etc. of respective neural networks may be set in advance. In this case, the terminal may determine the configuration for the neural network to be used from the pre-set candidate configurations according to the terminal network configuration information from the base station.

Figure 3:
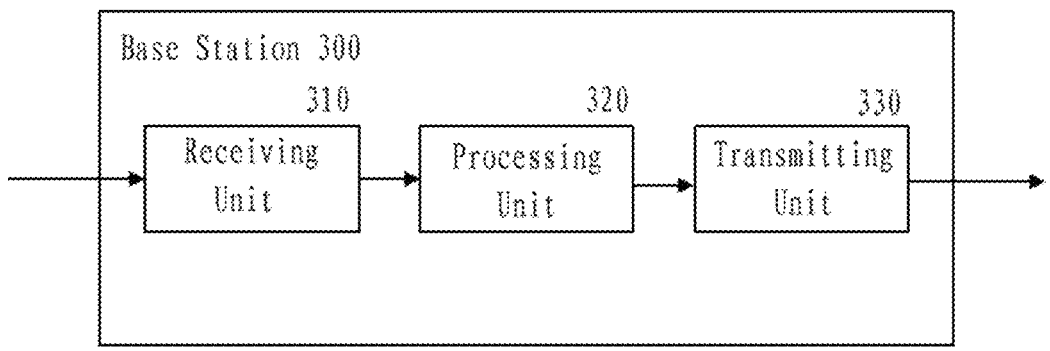
FIG. 3 is a schematic structural diagram of a base station according to an embodiment of the present disclosure.

In addition, as described above, according to an embodiment of the disclosure, the base station can know whether the terminal supports an AI function, the specific capabilities of the terminal related to running the neural network, or the attributes of the neural network supported by the terminal according to the terminal network capability information transmitted by the terminal, so that the base station configures a neural network suitable for the current communication for the terminal according to the relevant capabilities of the terminal. Hereinafter, a base station according to an embodiment of the present disclosure will be further described with reference to FIG. 3. FIG. 3 is a schematic structural diagram of a base station according to an embodiment of the present disclosure.

As shown in FIG. 3, the base station 300 includes a receiving unit 310, a processing unit 320, and a transmitting unit 330. The receiving unit 310 may receive terminal network capability information from a terminal. The terminal network capability information has been described in detail in combination with Tables 1 to 5 as above, so it will not be described repeatedly here.

The processing unit 320 may determine terminal network configuration information of the terminal according to the terminal network capability information received from the terminal. For example, the processing unit 320 may determine information about the type of the neural network to be used by the terminal, the number of network layers of the neural network, the number of nodes per layer, the connection relationship, the activation function, the network coefficient, and the like.

According to an example of the present disclosure, the processing unit 320 may determine the terminal network configuration information of the terminal according to an environment of the cell where the base station 300 is located in combination with the terminal network capability information from the terminal. According to another example of the present disclosure, the processing unit 320 may further determine the terminal network configuration information of the terminal according to the location of the terminal in combination with the terminal network capability information from the terminal. Thereby, the base station can determine the terminal network configuration information of the terminal not only according to the terminal network capability information from the terminal, but also according to the environment of the communication, other capabilities of the terminal, and the like. The transmitting unit 330 may then transmit the terminal network configuration information determined for the terminal by the processing unit 320 to the terminal.

According to an example of the present disclosure, the processing unit 320 may further determine the configuration for the neural network of the base station 300 itself according to the determined terminal network configuration information. Thereby, the base station can not only know the capabilities of the terminal, but also configure its own neural network based on the neural network of the terminal, so as to make better use of the neural networks of both the base station and the terminal.

In addition, according to another example of the present disclosure, the processing unit 320 may further determine an operation, a resource configuration, etc. of the corresponding terminal in subsequent communications according to the terminal network configuration information. For example, the processing unit 320 may determine whether a particular feedback (such as CSI feedback) is required to be performed by the terminal according to the determined terminal network configuration information, and if the particular feedback is required, the processing unit 320 may further determine feedback resource information of the terminal. The transmitting unit 330 may transmit the determined feedback resource information, or information indicating whether the particular feedback is required to be performed by the terminal. As another example, the processing unit 320 may determine modulation and coding scheme information to be used by the terminal according to the determined terminal network configuration information, where the modulation and coding scheme information may indicate a digital quantized modulation and coding scheme, and may also indicate an analog modulation and coding scheme. The transmitting unit 330 may transmit the determined modulation and coding scheme information.

The examples in which the terminal transmits its own terminal network capability information to the base station and the base station determines the neural network configuration for the terminal according to the terminal network capability information are described above in combination with FIG. 2 and FIG. 3. According to another embodiment of the present disclosure, the base station may also transmit its own processing function configuration or AI function configuration information to the terminal. For example, the base station may transmit its own network configuration information to the terminal. In addition, if the AI function of the base station is implemented in other manner than the neural network, the base station may obtain a configuration about the other manner itself. In the following examples of the present disclosure, description will be made by taking an AI function being implemented by a neural network as an example. However, as can be understood, similar solutions can also be used in cases where AI functions are implemented in other manner.

Figure 4:
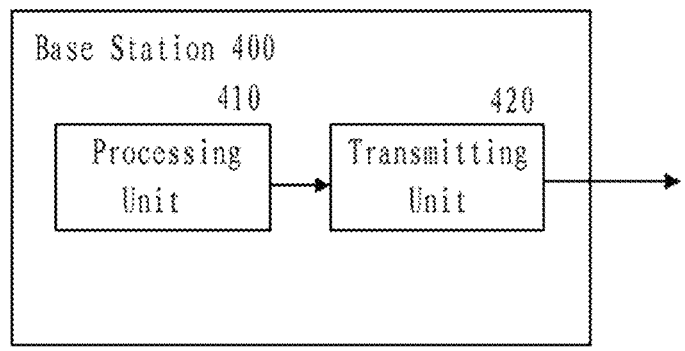
FIG. 4 is a schematic structural diagram of a base station according to another embodiment of the present disclosure.

Hereinafter, a base station according to another embodiment of the present disclosure will be described with reference to FIG. 4. FIG. 4 is a schematic structural diagram of a base station according to another embodiment of the present disclosure. As shown in FIG. 4, the base station 400 includes a processing unit 410 and a transmitting unit 420. The processing unit 410 may obtain base station network configuration information of the base station, where the base station network configuration information indicates a configuration for the neural network of the base station. For example, the base station network configuration information may indicate one or more of parameters such as the type of the neural network of the base station, the number of layers of the neural network, the number of nodes per layer, the connection relationship, the activation function, the network coefficients, and the like.

The transmitting unit 420 may transmit the determined base station network configuration information to the terminal. For example, the transmitting unit 420 may transmit the base station network configuration information through system information or an RRC message. Thereby, the terminal according to this embodiment can determine its own neural network configuration according to the neural network configuration for the base station.

Figure 5:
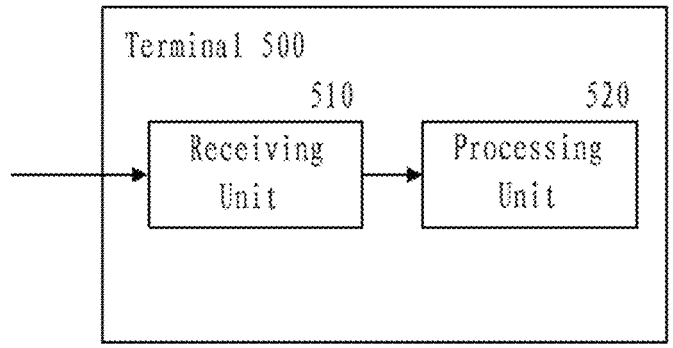
FIG. 5 is a schematic structural diagram of a terminal according to another embodiment of the present disclosure.

Hereinafter, a terminal according to another embodiment of the present disclosure will be described with reference to FIG. 5. FIG. 5 is a schematic structural diagram of a terminal according to an embodiment of the present disclosure.

As shown in FIG. 5, the terminal 500 includes a receiving unit 510 and a processing unit 520. The receiving unit 510 may receive base station network configuration information from a base station, where the base station network configuration information indicates a configuration for the neural network of the base station. Then, the processing unit 520 may determine the configuration for the neural network of the base station according to the base station network configuration information. Thus, the terminal 500 can operate according to the determined configuration for the neural network of the base station. For example, the processing unit 520 may determine the neural network configuration for the terminal 500 itself according to the configuration for the neural network of the base station.

In addition, the terminal 500 may further include a transmitting unit for transmitting one or more of the terminal network capability information indicating its own terminal network capability, information indicating the determined terminal-side neural network configuration, and the like to the base station, to facilitate subsequent operations of the base station. For example, the base station may determine the operation, resource configuration, etc. of the corresponding terminal in subsequent communications according to the terminal network configuration information.

Figure 6:
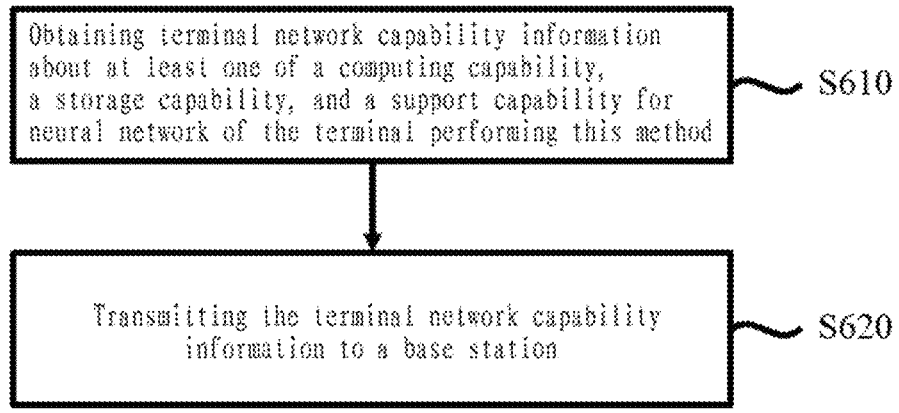
FIG. 6 is a flowchart of a transmitting method according to an embodiment of the present disclosure.

In the foregoing, a terminal according to an embodiment of the present disclosure has been described with reference to FIG. 2. Next, a transmitting method performed by the terminal is described with reference to FIG. 6. FIG. 6 is a flowchart of a transmitting method according to an embodiment of the present disclosure.

As shown in FIG. 6, the transmitting method 600 includes steps S610 and S620. In step S610, information related to the processing capability of the terminal or the AI capability of the terminal is obtained. For example, in step S610, terminal network capability (or capacity) information related to a neural network supported by the terminal executing the method 600 is obtained. For example, the terminal network capability information may include information about the attributes of the neural network itself that the terminal can support, such as information about the type of the neural network. In addition, the terminal network capability information may include information of capabilities related to running a neural network, such as information about a computing capability, a storage capability of the terminal, or the like. In the example shown in FIG. 6, in step S610, terminal network capability information about at least one of the computing capability, the storage capability, and the support capability for neural network of the terminal executing the method 600 may be obtained. In addition, if the AI function of the terminal 200 is implemented in other manner than a neural network, the processing unit 200 may obtain attribute information about the other manner itself, for example, information of the support capability for the other artificial intelligence algorithm, and information of capabilities related to running a neural network. In the following examples of the present disclosure, description will be made by taking an AI function being implemented by a neural network as an example. However, as can be understood, similar solutions can also be used in cases where AI functions are implemented in other manner.

According to an example of the present disclosure, the terminal network capability information may directly indicate specific attributes of the neural network itself, and specific capabilities related to running the neural network. For example, the computing capability of the terminal may be indicated by the number of floating-point operations that the terminal can perform per second. In this case, in step S610, the terminal network capability information may include information that directly indicates the number of floating-point operations that the terminal performing the method 600 can perform per second.

According to another example of the present disclosure, the attributes of the neural network itself and capabilities related to running the neural network may be graded or classified in advance, and in step S610, terminal network capability information of a level corresponding to the capabilities of the terminal performing the method 600 itself is obtained. In step S610, when the terminal network capability information includes information about a plurality of capabilities of the terminal's computing capability, storage capability, and support capability for neural network, the terminal network capability information includes information that indicates the plurality of capabilities respectively. Alternatively, according to another example of the present disclosure, a table that jointly indicates the plurality of capabilities may be set in advance. In step S610, when the terminal network capability information includes information about a plurality of capabilities of the terminal's computing capability, storage capability, and support capability for neural network, the terminal network capability information is information that jointly indicates the plurality of capabilities. The terminal network capability information has been described in detail in combination with Tables 1 to 5 as above, so it will not be described repeatedly here.

In addition, according to another example of the present disclosure, the method described in FIG. 6 may further include storing a network capability table such as Tables 1-5 as described above. The network capability table is a table about at least one of the computing capability, the storage capability, and the support capability for neural network. The network capability table may also be a table of a combination of more than one capabilities as described above.

Then, in step S620, the terminal network capability information is transmitted to the base station. According to an example of the present disclosure, in step S620, the terminal network capability information of the terminal performing the method 600 may be reported to the base station actively. According to another example of the present disclosure, in step S620, the terminal network capability information may be transmitted according to an instruction of the base station when the base station instructs the terminal performing the method 600 to report its AI capability or network support capability. For example, the method shown in FIG. 6 may further include receiving a capability acquisition request from the base station, and the terminal network capability information is transmitted to the base station according to the capability acquisition request.

In this embodiment, in step S620, by transmitting information about at least one of the computing capability, the storage capability, and the support capability for neural network of the terminal performing the method 600 itself to the base station, the base station can know whether the terminal supports an AI function, the specific capabilities of the terminal related to the running of the neural network, or the attributes of the neural network supported by the terminal, so that the base station configures a neural network suitable for the current communication for the terminal according to the relevant capabilities of the terminal.

For example, the base station may determine the terminal network configuration for the terminal performing the method 600 according to the terminal network capability information transmitted in step S620, and transmit related terminal network configuration information to the terminal, so that the terminal configures its own neural network according to the terminal network configuration information transmitted by the base station. In this case, the method 600 may further include receiving the terminal network configuration information from the base station, where the terminal network configuration information indicates a configuration for the neural network of the terminal performing the method 600.

According to an example of the present disclosure, the terminal network configuration information may include information about at least one of the number of network layers, the number of nodes per layer, the connection relationship, the activation function, and the network coefficient of the neural network of the terminal. For example, the connection relationship may include connection types of nodes in a neural network, such as a full connection, a convolutional neural network, a regression neural network, or the like. As another example, the activation function may include an activation function type of a layer of the neural network, such as Sigmoid, ReLU, or the like. As another example, the network coefficient may include weights on connections between nodes in respective layers of the network.

As mentioned before, candidate configurations for respective neural networks may be set in advance. For example, candidate configurations regarding the numbers of layers, the numbers of nodes per layer, connection relationship, network coefficients, activation functions, etc. of respective neural networks may be set in advance. In this case, the method 600 may further include determining the configuration for the neural network to be used by the terminal performing the method 600 from the pre-set candidate configurations according to the terminal network configuration information from the base station.

Figure 7:
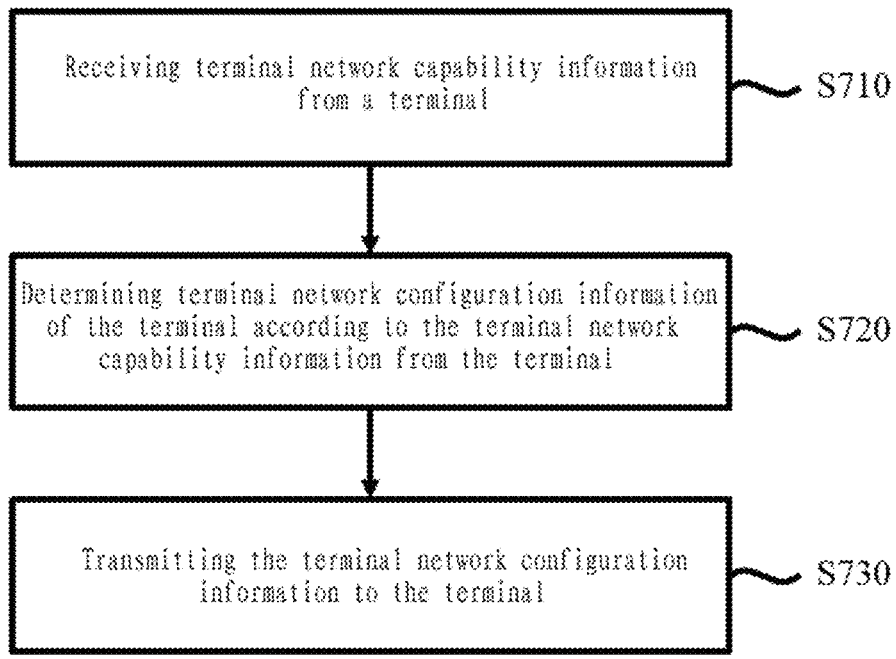
FIG. 7 is a flowchart of a receiving method according to an embodiment of the present disclosure.

In addition, as described above, according to an embodiment of the disclosure, by performing the method 600 by the terminal, the base station can know whether the terminal supports an AI function, the specific capabilities of the terminal related to running the neural network, or the attributes of the neural network supported by the terminal according to the terminal network capability information transmitted by the terminal, so that the base station configures a neural network suitable for the current communication for the terminal according to the relevant capabilities of the terminal. Hereinafter, a receiving method performed by a base station according to an embodiment of the present disclosure will be further described with reference to FIG. 7. FIG. 7 is a flowchart of a receiving method according to an embodiment of the present disclosure.

As shown in FIG. 7, the method 700 includes steps S710, S720, and S730. In step S710, terminal network capability information from a terminal is received. The terminal network capability information has been described in detail in combination with Tables 1 to 5 above, so it will not be described repeatedly here.

In step S720, terminal network configuration information of the terminal is determined according to the received terminal network capability information from the terminal. For example, in step S720, information about the type of the neural network to be used by the terminal, the number of network layers of the neural network, the number of nodes per layer, the connection relationship, the activation function, the network coefficient, and the like may be determined.

According to an example of the present disclosure, in step S720, the terminal network configuration information of the terminal may be determined according to the environment of the cell where the base station performing the method 700 is located, in combination with the terminal network capability information from the terminal. According to another example of the present disclosure, in step S720, the terminal network configuration information of the terminal may be further determined according to the location of the terminal in combination with the terminal network capability information from the terminal. Thereby, in step S720, the terminal network configuration information of the terminal can be determined not only according to the terminal network capability information from the terminal, but also according to the environment of the communication, other capabilities of the terminal, and the like. Then, in step S730, the terminal network configuration information determined for the terminal in step S720 is transmitted to the terminal.

According to an example of the present disclosure, the method 700 may further include step S740. In step S740, the configuration for the neural network of the base station performing the method 700 itself is determined according to the terminal network configuration information determined in step S720, and vice versa.

In addition, according to another example of the present disclosure, the method 700 may further include: determining an operation, resource configuration, etc. of the corresponding terminal in subsequent communications according to the terminal network configuration information. For example, it may be determined whether a particular feedback (such as CSI feedback) is required to be performed by the terminal according to the determined terminal network configuration information, and if the particular feedback is required, feedback resource information of the terminal may be further determined. In addition, in the method 700, the determined feedback resource information or information indicating whether the particular feedback is required to be performed by the terminal may be transmitted. As another example, in the method 700, modulation and coding scheme information to be used by the terminal may be determined according to the determined terminal network configuration information, where the modulation and coding scheme information may indicate a digital quantized modulation and coding scheme, and may also indicate an analog modulation and coding scheme. In the method 700, the determined modulation and coding scheme information may be transmitted.

The examples in which the terminal transmits its own terminal network capability information to the base station and the base station determines the neural network configuration for the terminal according to the terminal network capability information are described above in combination with FIG. 6 and FIG. 7. According to another embodiment of the present disclosure, the base station may also transmit its own processing function configuration or AI function configuration information to the terminal. For example, the base station may transmit its own network configuration information to the terminal. In addition, if the AI function of the base station is implemented in other manner than the neural network, the base station may obtain a configuration about the other manner itself. In the following examples of the present disclosure, description will be made by taking an AI function being implemented by a neural network as an example. However, as can be understood, similar solutions can also be used in cases where AI functions are implemented in other manner.

Figure 8:
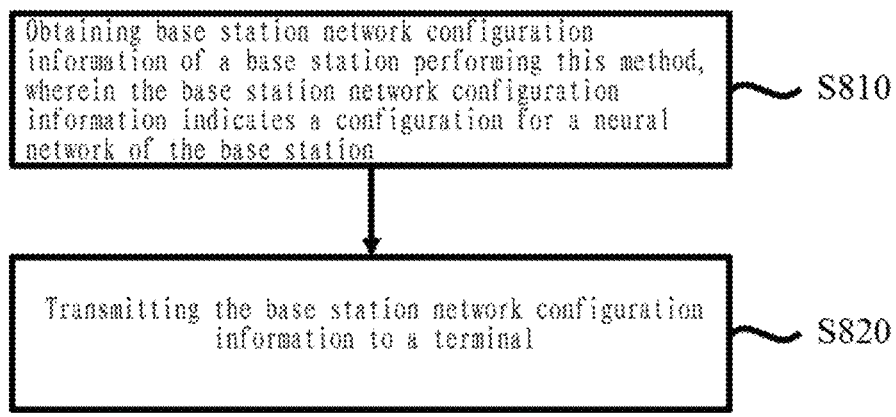
FIG. 8 is a flowchart of a transmitting method according to another embodiment of the present disclosure.

Hereinafter, a transmitting method performed by a base station according to another embodiment of the present disclosure will be described with reference to FIG. 8. FIG. 8 is a flowchart of a transmitting method according to another embodiment of the present disclosure. As shown in FIG. 8, the transmitting method 800 includes steps S810 and S820. In step S810, base station network configuration information of the base station performing the method 800 may be obtained, where the base station network configuration information indicates a configuration for the neural network of the base station. For example, the base station network configuration information may indicate one or more of parameters such as the type of the neural network of the base station, the number of layers of the neural network, the number of nodes per layer, the connection relationship, the activation function, the network coefficient and the like.

In step S820, the determined base station network configuration information is transmitted to the terminal. For example, in step S820, the base station network configuration information may be transmitted through system information or an RRC message. Thereby, the terminal that receives the base station network configuration information in step S820 may determine its own neural network configuration according to the neural network configuration for the base station.

Figure 9:
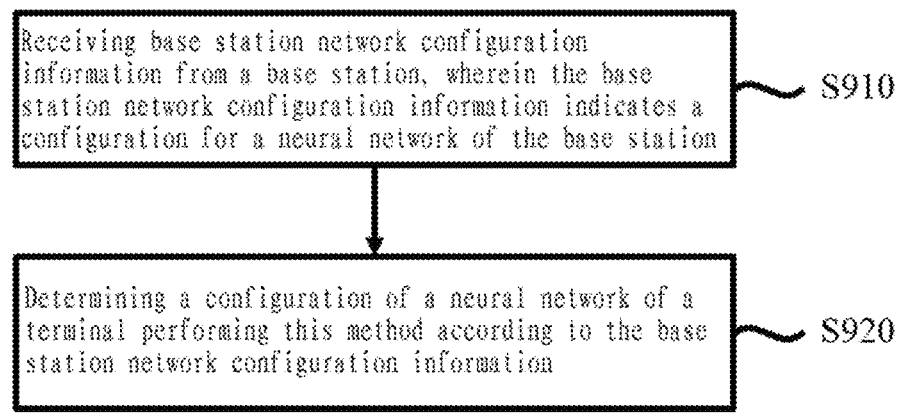
FIG. 9 is a flowchart of a receiving method according to another embodiment of the present disclosure.

Hereinafter, a receiving method performed by a terminal according to another embodiment of the present disclosure will be described with reference to FIG. 9. FIG. 9 is a flowchart of a receiving method according to another embodiment of the present disclosure.

As shown in FIG. 9, the receiving method 900 includes steps S910 and S920. In step S910, base station network configuration information from a base station may be received, where the base station network configuration information indicates a configuration for the neural network of the base station. Then, in step S920, the configuration for the neural network of the base station is determined according to the base station network configuration information. Thereby, the terminal can operate according to the determined configuration for the neural network of the base station. The method shown in FIG. 9 may further include determining the neural network configuration for the terminal itself according to the configuration for the neural network of the base station.

In addition, the receiving method 900 may further include transmitting one or more of terminal network capability information indicating the terminal network capability of the terminal performing the method 900 itself, information indicating the determined terminal-side neural network configuration, and the like to the base station, to facilitate subsequent operations of the base station. For example, the base station may determine the operation, the resource configuration, etc. of the corresponding terminal in subsequent communications according to the terminal network configuration information.

<Hardware Structure>

In addition, block diagrams used for the description of the above embodiments illustrate functional blocks of functional units. These functional blocks (structural units) may be implemented in arbitrary combination of hardware and/or software. Also, the means for implementing each functional block is not particularly limited. That is, the respective functional blocks may be implemented by one apparatus that is physically and/or logically jointed; or more than two apparatuses that are physically and/or logically separated may be directly and/or indirectly (e.g., wiredly and/or wirelessly) connected, and the respective functional blocks may be implemented by these apparatuses.

Figure 10:
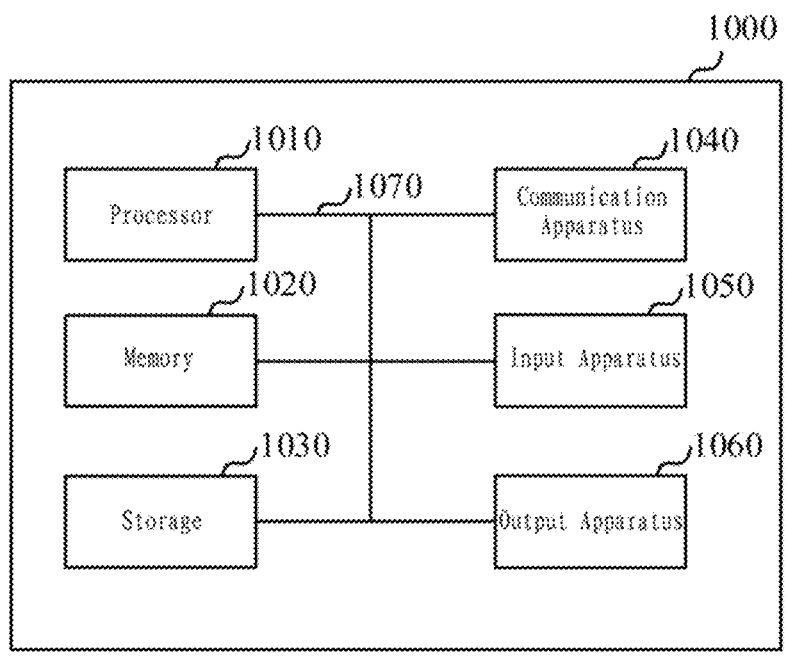
FIG. 10 is a schematic diagram of a hardware structure of a device related to embodiments of the present disclosure.

For example, a device (such as, a first communication device, a second communication device, or a flying user terminal) according to an embodiment of the present disclosure may function as a computer that executes the processes of the wireless communication methods of the present disclosure. FIG. 10 is a schematic diagram of a hardware structure of a device 1000 related to embodiments of the present disclosure. The above device 1000 (base station or user terminal) may be physically constituted as a computer apparatus comprising a processor 1010, a memory 1020, a storage 1030, a communication apparatus 1040, an input apparatus 1050, an output apparatus 1060, a bus 1070, etc.

In addition, in the following description, the term "apparatus" may be replaced with a circuit, a device, a unit or the like. The hardware structure of the base station and the user terminal may include one or more apparatuses shown in the figure, or may not include a part of the apparatuses.

For example, only one processor 1010 is illustrated, but there may be multiple processors. In addition, the processing may be performed by one processor, or may be performed by one or more processors simultaneously, sequentially, or by other methods. Additionally, the processer 1010 may be assembled by using more than one chips.

Respective functions of the device 1000 are implemented by reading designated software (program) on hardware such as the processer 1010 and the memory 1020, and thus by computation performed by the processor 1010, by the control of the communication performed by the communication apparatus 1040, and by the control of reading and/or writing of data in the memory 1020 and the storage 1030.

The processor 1010, for example, operates an operating system to control the entire computer. The processor 1010 may be constituted by a central processing apparatus (CPU: central processing unit), which includes interfaces with peripheral apparatus, control apparatus, computing apparatus, a register, etc. For example, the above-described determining unit and processing unit may be implemented by the processor 1001.

In addition, the processor 1010 reads programs (program codes), software modules, data, etc. from the storage 1030 and/or the communication apparatus 1040 to the memory 1020, and execute various processing in accordance with contents thereof. As a program, a program causing the computers to execute at least a part of the operations described in the above embodiments may be used. For example, the processing unit of the terminal or the base station may be implemented by a control program stored in the memory 1020 and operated by the processor 1010, and other functional blocks may also be implemented similarly.

The memory 1020 is a computer-readable recording medium, and may be constituted, for example, by at least one of a ROM (a Read Only Memory), an EPROM (Erasable Programmable ROM), an EEPROM (Electrically Erasable Programmable ROM), a RAM (Random Access Memory), and other suitable storage medium. The memory 1020 may be referred to as a register, a cache, a main memory (a main storage apparatus), etc. The memory 1020 can store executable programs (program code), software modules or the like for implementing the method of an embodiment of the present disclosure.

The storage 1030 is a computer-readable recording medium, and may be constituted, for example, by at least one of a flexible disk, a floppy (registered trademark) disk (floppy disk), a magnetic optical disk (e.g., CD-ROM (Compact Disc ROM), a digital versatile optical disk and a Blu-ray (registered trademark) optical disk), a removable disk, a hard drive, a smart card, a flash device (e.g., a card, a stick and a key driver), a magnetic stripe, a database, a server and other suitable storage medium. The storage 1030 may be referred to as an auxiliary storage device.

The communication apparatus 1040 is hardware (transceiver device) performing communication between computers via a wired and/or wireless network, and is also referred to as a network device, a network controller, a network card, a communication module or the like, for example. The communication device 1140 may include a high frequency switch, a duplexer, a filter, a frequency synthesizer, etc., in order to implement, for example, Frequency Division Duplex (FDD) and/or Time Division Duplex (TDD). For example, the above-described transmitting unit, receiving unit can be implemented by the communication device 1040.

The input apparatus 1050 is an input device (e.g., a keyboard, a mouse, a microphone, a switch, a button, a sensor, etc.) that receives input from the outside. The output apparatus 1060 is an output device (e.g., a display, a speaker, a LED light, etc.) that performs output to the outside. In addition, the input apparatus 1050 and the output apparatus 1060 may be an integrated configuration (e.g., a touch screen).

In addition, the respective apparatuses such as the processor 1010 and the memory 1020 are connected by the bus 1070 that communicates information. The bus 1070 may be constituted by a single bus or by different buses between the apparatuses.

In addition, the base station and the user terminal may comprise hardware such as a microprocessor, a digital signal processor (DSP), an ASIC (Application Specified Integrated Circuit), a PLD (Programmable Logic Device), an FPGA (Field Programmable Gate Array), etc., and the hardware may be used to implement a part of or all of the respective functional blocks. For example, the processor 1010 may be installed by at least one of the hardware.

<Variation>

In addition, the terms described in the present specification and/or terms needed to understand the present specification may be interchanged with terms having the same or similar meanings. For example, a channel and/or a symbol may be a signal (signaling). In addition, a signal may be a message. A reference signal may also be simply referred to as a RS, and may also be referred to as a pilot, a pilot signal, or the like according to applicable standards. In addition, a component carrier (CC) may also be referred to as a cell, a frequency carrier, a carrier frequency, or the like.

In addition, information, parameters, etc. described in the present specification may be represented by absolute values, relative values to a designated value or other corresponding information. For example, a wireless resource may be indicated by a designated index. Furthermore, equations or the like using these parameters may be different from that explicitly disclosed in the present specification.

Names used for the above parameters in the specification are not limitative in any aspect. For example, various channels (e.g., Physical Uplink Control Channel (PUCCH), Physical Downlink Control Channel (PDCCH), etc.) and information elements may be identified using any suitable names, so these various names allocated to the various channels and information elements are not limitative in any aspect.

Information, a signal or the like described in the present specification may be represented using any of a variety of different technologies. For example, data, an instruction, a command, information, a signal, a bit, a symbol, a chip, etc. referred to throughout the above description may be represented using a voltage, a current, an electromagnetic wave, a magnetic field or a magnetic particle, an optical field or photon, or any combination thereof.

Further, information, a signal or the like may be output from an upper layer to a lower layer, and/or from a lower layer to an upper layer. Information, a signal or the like may be input or output via a plurality of network nodes.

Input/output information, signal or the like may be stored in a specific place (such as the memory) or managed by a management table. The input/output information, signal or the like can be overwritten, updated or added. The output information, signal or the like may be deleted. The input information, signal or the like may be transmitted to other apparatuses.

The notification of information is not limited to the mode/embodiment described in the specification, and may be performed by other methods. For example, the notification of information may be performed through physical layer signaling (for example, Downlink Control Information (DCI) or Uplink Control Information (UCI)), and upper layer signaling (for example, Radio Resource Control (RRC) signaling, broadcast information (Master Information Block (MIB), System Information Block (SIB) or the like), Medium Access Control (MAC) signaling), other signals, or a combination thereof.

Further, the physical layer signaling may be referred to as L1/L2 (Layer 1/Layer 2) control information (L1/L2 control signal), L1 control information (L1 control signal), or the like. In addition, the RRC signaling may be referred to as an RRC message, and may be, for example, an RRC Connection Setup message, an RRC Connection Reconfiguration message, or the like. Furthermore, the MAC signaling can be notified, for example, by a MAC Control Element (MAC CE).

In addition, notification of designated information (for example, the notification of "X") is not limited to being explicitly performed, and may be implicitly performed (for example, by not notifying the designated information, or by the notification of other information).

The deciding may be performed by using a value (0 or 1) represented by 1 bit, or by using a true or false value (Boolean: true or false), or by using comparison of numerical values (for example, comparison with a designated value).

Irrespective of whether the software is called software, firmware, middle-ware, micro-code, hardware descriptive language, or other names, the software should be broadly interpreted as instructions, instruction sets, codes, code segments, program codes, program, sub-program, software module, application, software application, software package, routine, sub-routine, object, executable file, execution thread, step, function or the like.

In addition, software, instructions, information, etc. may be transmitted and received via a transmission medium. For example, in case that the software is transmitted from a website, a server or other remote source using wired technologies such as coaxial cables, fibers, twisted pairs and digital subscriber lines (DSLs) and/or wireless technologies such as infrared ray and microwave, these wired technologies and/or wireless technologies are included in the definition of the transmission medium.

Terms such as "system" and "network" used in this specification may be used interchangeably.

In the present specification, the terms such as "base station (BS)", "wireless base station", "eNB", "gNB", "cell", "sector", "cell group", "carrier", and "component carrier" can be used interchangeably. The base station is sometimes also referred to as a fixed station, a NodeB, an eNodeB (eNB), an access point, a transmission point, a reception point, a femto cell, a small cell, etc.

The base station is capable of accommodating one or more (for example, three) cells (also referred to as sectors). In a case where the base station accommodates a plurality of cells, an entire coverage area of the base station is capable of being divided into a plurality of smaller areas, and each smaller area is capable of providing communication services using a base station sub-system (for example, a small base station for indoor use (a remote radio head (RRH)). The terms "cell" and "sector" refer to a part of or an entirety of a coverage area of the base station and/or a base station sub-system providing communication services in the coverage area.

In the present specification, terms such as "Mobile Station (MS)", "User Terminal", "User Equipment (UE)", and "terminal" may be used interchangeably. The mobile station is sometimes referred to by those skilled in the art as a user station, a mobile unit, a user equipment, a wireless unit, a remote unit, a mobile device, a wireless device, a wireless communication device, a remote device, a mobile user station, an access terminal, a mobile terminal, a wireless terminal, a remote terminal, a handheld terminal, a user agent, a mobile client, a client, or several other suitable terms.

In addition, the wireless base station in the present specification may be replaced with a user terminal. For example, each mode/embodiment of the present disclosure can be applied to a configuration in which communication between a base station and a user terminal is replaced with communication among multiple user terminals (Device-to-Device (D2D)) communication. At this time, a function of the first communication device and the second communication device in the above-described device 1000 may be regarded as a function of the user terminal. In addition, words such as "uplink" and "downlink" can also be replaced with "side". For example, the uplink channel can also be replaced with a side channel.

Similarly, the user terminal in the present specification may also be replaced with a base station. At this time, the function of the user terminal described above may be regarded as a function of the first communication device and the second communication device.

In the present specification, particular operations performed by the base station may be performed by an upper node thereof sometimes according to situations. In a network comprised of one or a plurality of network nodes having the base station, it is obvious that various operations performed for communication with the terminal may be performed by the base station or one ore more network nodes other than the base station (e.g., MME (Mobility Management Entity), S-GW (Serving-Gateway) and so on, but the invention is not limited thereto), or a combination thereof.

The manners/implementations described in the present specification may be used alone or in combination, or may be switched during execution. Orders of the processing steps, procedures, flow charts and the like of the respective manners/implementations described in the present disclosure may be changed as long as there is no contradiction. For example, the methods described in the present specification exhibit elements of the various steps in exemplary orders, but are not limited to the specific orders exhibited.

The respective manners/implementations described in the present specification may be applied to LTE (Long Term Evolution), LTE-A (LTE-advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), Global System for Mobile Communications (GSM (registered trademark)), Code Division Multiple Access 2000

(CDMA2000), UMB (Ultra Mobile Broadband), IEEE802.11 (Wi-Fi (registered trademark)), IEEE802.16 (WiMAX (registered trademark)), IEEE802.20, UWB (Ultra Broadband), Bluetooth (registered trademark), a system employing other suitable wireless communication methods and/or a next-generation system that are extended based on these systems.

The term "based on" used in the present specification do not mean "only based on" unless it is explicitly stated. In other words, the expression "based on" refers to both "only based on" and "at least based on".

Any reference to elements using terms like "first" and "second" used in the present specification does not fully restrict quantity or order of these elements. These terms can be used in the present specification as a convenient method distinguishing between more than two elements. Therefore, a reference to a first and a second element does not mean that only two elements can be used, or that the second element must, in any form, be preceded by the first element.

The terms such as "deciding" or "determining" used in the present specification sometimes comprise a wide variety of operations. The "deciding" or "determining" may include regarding, for example, calculating, computing, processing, deriving, investigating, looking up (e.g., looking up in a table, a database or other data structures) and ascertaining as performing the "deciding" or "determining". In addition, the "deciding" or "determining" may include regarding receiving (e.g., receiving information), transmitting (for example, transmitting information), inputting, outputting and accessing (e.g., accessing data in the memory) as performing the "deciding" or "determining". In addition, the "deciding" or "determining" may include regarding resolving, selecting, choosing, establishing, comparing and the like as performing the "deciding" or "determining". That is to say, the "deciding" or "determining" may include regarding certain operations as the "deciding" or "determining".

The terms "connected", "coupled" or the like as used in the present specification, or any variant thereof, refer to any direct or indirect connection or coupling between two or more units, which includes the case where there is one or more intermediate units between two units that are "connected" or "coupled" to each other. The coupling or connection between the units may be physical, logical, or a combination thereof. For example, "connection" can also be replaced with "access". When used in the present specification, two units may be considered to be "connected" or "coupled" to each other by using one or more wires, cables, and/or printed electrical connection, and as several non-limiting and non-exhaustive examples, by using electromagnetic energy having wavelength of radio frequency region, microwave region, and/or light (both visible and invisible) region.

When terms such as "include," "comprise" and variations of these are used in this specification or in claims, these terms are intended to be inclusive, like the term "having". Furthermore, the term "or" used in the context of the present specification or claims does not mean exclusive or.

The present disclosure has been described in detail above, but it should be obvious to a person skilled in the art that the present disclosure is by no means limited to the embodiments described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way

The invention claimed is:

1. A terminal, comprising:
a processor coupled to a memory for obtaining neural network capability information of the terminal,
wherein the neural network capability information of the terminal includes information about at least one of a computing capability of the terminal, a storage capability of the terminal, and a support capability for neural network of the terminal; and
a transmitter for transmitting the neural network capability information of the terminal to a base station.

2. The terminal according to claim 1, wherein
when the neural network capability information of the terminal includes information about a plurality of capabilities of the computing capability of the terminal, the storage capability of the terminal, and the support capability for neural network of the terminal, the neural network capability information of the terminal is information that indicates the plurality of capabilities respectively.

3. The terminal according to claim 1, wherein
when the neural network capability information of the terminal includes information about a plurality of capabilities of the computing capability of the terminal, the storage capability of the terminal, and the support capability for neural network of the terminal, the neural network capability information of the terminal is information that jointly indicates the plurality of capabilities.

4. The terminal according to claim 1, further comprising:
the memory for storing a network capability table, wherein the network capability table is a table about at least one of the computing capability of the terminal, the storage capability of the terminal, and the support capability for neural network.

5. The terminal according to claim 1, further comprising:
a receiver for receiving a capability acquisition request from the base station; wherein
the transmitter transmits the neural network capability information of the terminal to the base station according to the capability acquisition request.

6. The terminal according to claim 1, further comprising:
a receiver for receiving terminal network configuration information from the base station, wherein
the terminal network configuration information indicates a configuration for a neural network of the terminal.

7. The terminal according to claim 6, wherein
the terminal network configuration information includes information about at least one of a number of network layers, a number of nodes per layer, connection relationship, an activation function, and a network coefficient of the neural network of the terminal.

8. A terminal comprising:
a receiver for receiving base station network configuration information from a base station, wherein the base station network configuration information indicates a configuration for a neural network of the base station; and
a processor for determining the configuration for the neural network of the base station according to the base station network configuration information, and determining the neural network configuration for the terminal itself according to the configuration for the neural network of the base station.

9. A base station comprising:
a receiver for receiving network capability information of a terminal from the terminal;

a processor for determining terminal network configuration information of the terminal according to neural network capability information of the terminal; and a transmitter for transmitting the terminal network configuration information to the terminal.

* * * * *